United States Patent
Bringert et al.

(10) Patent No.: US 9,135,914 B1
(45) Date of Patent: Sep. 15, 2015

(54) LAYERED MOBILE APPLICATION USER INTERFACES

(75) Inventors: Bjorn Erik Bringert, Bath (GB); Pawel Pietryka, London (GB); Peter John Hodgson, London (GB); Simon Tickner, Whitstable (GB); Henrique Penha, San Francisco, CA (US); Richard Zarek Cohen, London (GB); Luca Zanolin, London (GB)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 13/621,094

(22) Filed: Sep. 15, 2012

Related U.S. Application Data (60) Provisional application No. 61/542,135, filed on Sep. 30, 2011.

(51) Int. Cl.
| | | |
|---|---|---|
| *G10L 21/00* | (2013.01) | |
| *G10L 25/00* | (2013.01) | |
| *G06F 3/01* | (2006.01) | |
| *G06F 3/16* | (2006.01) | |
| *G10L 15/22* | (2006.01) | |

(52) U.S. Cl.
CPC ............... *G10L 15/22* (2013.01); *G06F 3/016* (2013.01)

(58) Field of Classification Search
USPC .................................................. 715/716, 727
See application file for complete search history.

(56) References Cited

U.S. PATENT DOCUMENTS

| | | | |
|---|---|---|---|
| 5,890,122 A * | 3/1999 | Van Kleeck et al. .......... 704/275 |
| 6,085,159 A | 7/2000 | Ortega et al. | |
| 6,182,046 B1 | 1/2001 | Ortega et al. | |
| 6,308,157 B1 | 10/2001 | Vanbuskirk et al. | |
| 6,751,594 B1 | 6/2004 | Diehl et al. | |
| 7,318,198 B2 * | 1/2008 | Sakayori et al. ............... 715/729 |
| 7,434,158 B2 * | 10/2008 | Chi et al. ....................... 715/239 |
| 7,685,252 B1 * | 3/2010 | Maes et al. .................... 709/217 |
| 7,783,492 B2 * | 8/2010 | Bangalore et al. ............. 704/275 |
| 8,027,840 B2 | 9/2011 | Cross, Jr. et al. | |
| 8,312,391 B2 * | 11/2012 | Shin et al. ...................... 715/862 |
| 8,370,062 B1 * | 2/2013 | Starenky et al. ............... 701/467 |
| 2003/0046346 A1 * | 3/2003 | Mumick et al. ................ 709/205 |
| 2004/0260438 A1 | 12/2004 | Chernetsky et al. | |
| 2008/0250011 A1 * | 10/2008 | Haubold et al. ................... 707/5 |
| 2009/0030691 A1 * | 1/2009 | Cerra et al. .................... 704/255 |
| 2009/0030696 A1 * | 1/2009 | Cerra et al. .................... 704/275 |
| 2009/0153289 A1 * | 6/2009 | Hope et al. ..................... 340/5.1 |
| 2010/0106497 A1 * | 4/2010 | Phillips ......................... 704/231 |
| 2010/0188342 A1 * | 7/2010 | Dunn ............................. 345/173 |

(Continued)

*Primary Examiner* — Richemond Dorvil
*Assistant Examiner* — Michael Ortiz Sanchez
(74) *Attorney, Agent, or Firm* — McDonnell Boehnen Hulbert & Berghoff LLP (57) ABSTRACT

Disclosed are systems, methods, and devices for providing a layered user interface for one or more applications. A user-interface layer for a voice user interface is generated. The user-interface layer can be based on a markup-language-structured user-interface description for an application configured to execute on a computing device. The user-interface layer can include a command display of one or more voice-accessible commands for the application. The computing device can display at least the user-interface layer of the voice user interface. The computing device can receive an input utterance, obtain input text based upon speech recognition performed upon the input utterance, and determine that the input text corresponds to a voice-accessible command displayed as part of the command display. The computing device can execute the application to perform the command.

15 Claims, 5 Drawing Sheets

(56) References Cited

U.S. PATENT DOCUMENTS

| | | | |
|---|---|---|---|
| 2011/0003585 A1* | 1/2011 | Wang et al. | 455/418 |
| 2011/0054898 A1* | 3/2011 | Phillips et al. | 704/235 |
| 2011/0112836 A1* | 5/2011 | Kurki-Suonio et al. | 704/235 |
| 2011/0141052 A1* | 6/2011 | Bernstein et al. | 345/174 |
| 2011/0161852 A1* | 6/2011 | Vainio et al. | 715/769 |
| 2012/0159364 A1* | 6/2012 | Hyun | 715/766 |
| 2012/0215543 A1* | 8/2012 | Oz et al. | 704/275 |
| 2013/0103383 A1* | 4/2013 | Du et al. | 704/3 |
| 2013/0234931 A1* | 9/2013 | Keranen et al. | 345/156 |
| 2013/0268260 A1* | 10/2013 | Lundberg et al. | 704/8 |

* cited by examiner

LAYERED MOBILE APPLICATION USER INTERFACES

CROSS-REFERENCE TO RELATED APPLICATIONS

This patent application claims priority to U.S. Provisional Application No. 61/542,135, filed on Sep. 30, 2011, the contents of which are entirely incorporated herein by reference, as if fully set forth in this application.

BACKGROUND

Unless otherwise indicated herein, the materials described in this section are not prior art to the claims in this application and are not admitted to be prior art by inclusion in this section.

Software and/or hardware applications can be used to display, generate, and communicate electronic communications, such as electronic mail, short messages, blog entries, web pages, etc. Some applications include one or more user interfaces to permit a user to interact with the application; for example, by entering text into a word processing application, or to send a message using an e-mail or other messaging application.

Several modern applications have multiple user interfaces, such as a voice-based user interface and a text-based user interface. In some scenarios, these applications permit the user to switch between the multiple user interfaces. For example, a word processing application may permit entry of text via speech or via a textual interface, such as a keyboard or touch pad. These multiple-user-interface applications can operate on various computing platforms, such as desktops, laptops, special-purpose devices such as game machines, and mobile devices.

SUMMARY

In a first aspect, a method is provided. A user-interface layer for a voice user interface is generated. The user-interface layer is based on a markup-language-structured user-interface description for an application configured to execute on a computing device. The user-interface layer includes a command display of one or more voice-accessible commands for the application. The computing device displays at least the user-interface layer of the voice user interface. The computing device receives an input utterance, obtains input text based upon speech recognition performed upon the input utterance, and determines that the input text corresponds to a voice-accessible command displayed as part of the command display. The computing device executes the application to perform the command.

In a second aspect, a computing device is provided. The computing device includes: a display, at least one input device, a processor, and memory. The memory has one or more instructions that, upon execution by the processor, cause the computing device to perform functions. The functions include: generating a user-interface layer for a voice user interface that is based on a markup-language-structured user-interface description for an application configured to execute on the computing device, the user-interface layer including a command display of one or more voice-accessible commands for the application, displaying on the display at least the user-interface layer of the voice user interface, receiving an input utterance via the at least one input device, obtaining input text based upon speech recognition performed upon the input utterance, determining that the input text corresponds to a voice-accessible command displayed as part of the command display, and executing the application to perform the command.

In a third aspect, an article of manufacture is provided. The article of manufacture includes a computer-readable storage medium having instructions stored thereon that, upon execution by a computing device comprising a display and at least one input device, cause the computing device to perform functions. The functions include: generating a user-interface layer for a voice user interface that is based on a markup-language-structured user-interface description for an application configured to execute on the computing device, the user-interface layer including a command display of one or more voice-accessible commands for the application, displaying on the display at least the user-interface layer of the voice user interface, receiving an input utterance via the at least one input device, obtaining input text based upon speech recognition performed upon the input utterance, determining that the input utterance corresponds to a voice-accessible command displayed as part of the command display, and executing the application to perform the command.

DETAILED DESCRIPTION

Overview

As computing devices get more sophisticated, ubiquitous, and mobile, some users prefer to interact with computing devices using one type of user interface. For example, some prefer to use voice or speech input interfaces to devices, some prefer graphical interfaces, and some prefer textual interfaces. However, many people prefer to use multiple interfaces interchangeably. For example, some prefer dictating to word-processing and messaging applications, using mainly a point-and-click graphical interface while web surfing, and utilizing a keyboard or touch screen to enter authentication or financial information, such as a password or credit card number.

Use of a voice user interface can present particular difficulties. For example, the voice interface may not provide any information about how to use the interface, such as terminology used to address the interface. For example, one voice interface for a clock application may have two commands "Show time" and "Hide time", while another voice interface may use commands such as "Display time", "Display date", "Display time and date", "Format time", "Format date", "Remove time", "Remove date", and "Remove time and date." Without some information about how to use the interface, a user may end up speaking to a device operating the voice interface to no avail.

Also, voice interfaces can be used by distracted users; for example, a user may use a voice interface to a mobile device while driving, walking, or entertaining friends. As such, voice interfaces should provide usage information to aid new and distracted users, and to remind even expert users of how to use the voice interface. The user interface for voice can have distinct visual features, such as use of different fonts, font sizes, colors, etc. used by visual portions of a voice user interfaces. In some embodiments, voice-specific visual information as part of a "voice user-interface layer" can be provided. Example components of the voice user-interface layer include a recognition-feedback region that displays text corresponding to spoken commands and/or a "command display" of voice commands and their usage. Other components to the voice user-interface layer are possible as well.

Many applications provide structured information about user interfaces, such as voice interfaces. This structured information can be defined and/or specified using a language such as a user interface markup language (UIML), eXtended Markup Language (XML), or another language. For example, the structured definition about the voice interface can include possible commands and parameters that the voice interface can accept. This voice interface information can be scanned by a computing device to determine a list of possible commands and parameters to these commands. This list of possible commands can be presented to the user as part of the command display of the voice user-interface layer for the application.

In some cases, a software provider can have a set of applications, where each application in the set of applications conforms to a structured definition that ensures a consistent "look and feel" or user-interface experience for all applications in the set of applications. For example, all applications in the set of applications can use a "verb/object" order in commands. As another example, all applications in the set of applications can use the verb "Remove" to indicate the concept of removal, deletion, removal, discarding, casting off, etc. within the user interface. Use of the structured definition can ensure consistency of the voice interface; e.g., ensure that all voice interfaces use the verb "Remove" in voice commands, or a particular word order within voice commands.

Some application designers can ensure that commands available to a voice interface are "safe" commands. For example, the commands available to a voice interface to an electronic contact-list application may permit reading, updating, and inserting contacts, but not deleting contacts as unsafe. Deleting contacts via a voice interface can be considered unsafe, as a voice recognition device or module can have difficulties recognizing names, and as contacts are typically organized by last name, the difficulties in recognizing names can potentially lead to deleting an incorrect contact.

As such, other user interfaces, such as a text-based or touch-based user interface, can permit commands not available via a voice user interface. Thus, in some scenarios, users may desire to switch between user interfaces or perhaps use both a voice user interface and a non-voice user interface simultaneously.

These techniques can be used to provide better voice user interfaces that show users how to interact vocally with a computing device. Also, techniques for utilizing and switching between multiple user interfaces of an application are provided herein, which permit utilization of aspects of each user interface simultaneously, increasing user productivity and ease of use of the application.

Computing Device Architecture

Figure 1:
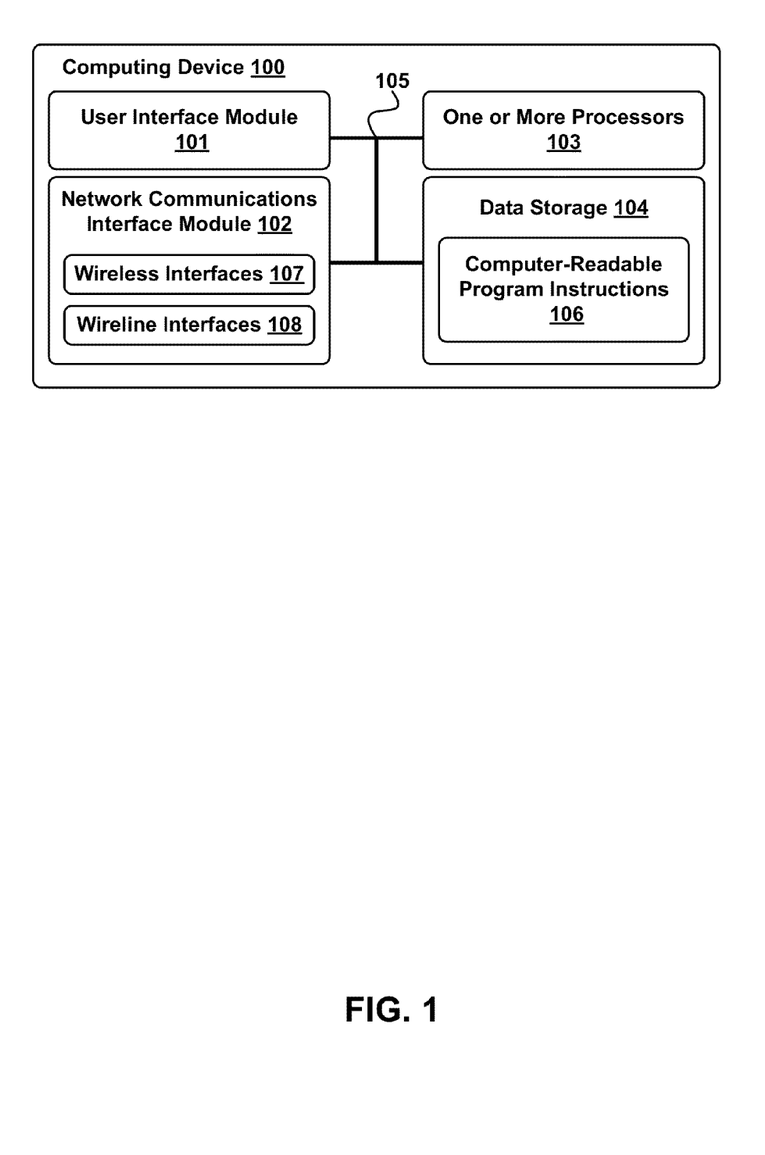
FIG. 1 is a block diagram of a computing device, in accordance with example embodiments.

FIG. 1 shows an example computing device 100 that can be used to perform some or all of the functionality, techniques, processes, and/or methods described herein. FIG. 1 is a block diagram of a computing device (e.g., system) 100 in accordance with an example embodiment. Computing device 100 can include user interface module 101, network-communication interface module 102, one or more processors 103, and data storage 104, all of which can be linked together via a system bus, network, or other connection mechanism 105.

User interface module 101 can be operable to send data to and/or receive data from external user input/output devices. For example, user interface module 101 can be configured to send and/or receive data to and/or from user input devices such as a keyboard, a keypad, a touch screen, a computer mouse, a track ball, a joystick, a camera, a microphone, a voice recognition module, and/or other similar devices. User interface module 101 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 101 can also be configured to generate audible output(s), such as a speaker, speaker jack, audio output port, audio output device, earphones, and/or other similar devices.

In some embodiments, user interface module 101 can include one or more user-interface layers, such as a voice user-interface layer. The user-interface layer(s) can be based on a user-interface description for an application configured to execute on computing device 100. The user-interface layer can include a command display, listing commands and perhaps parameters to the commands that can be used to direct the user interface. In some embodiments, the user-interface layer can provide feedback about the user interface. For example, a recognition-feedback region of a voice user-interface layer can display text translated from spoken commands provided via a voice user interface. Thus, a user can receive feedback about whether spoken commands are or are not properly translated to text. The voice user-interface layer may also include speech-to-text and/or text-to-speech modules to translate speech, such as voice commands, to text and vice versa.

Network-communications interface module 102 can include one or more wireless interfaces 107 and/or one or more wireline interfaces 108 that are configurable to communicate via a network. Wireless interfaces 107 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 108 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 102 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 103 can include one or more general purpose processors and/or one or more special purpose processors (e.g., digital signal processors, application specific integrated circuits, etc.). Processors 103 can be configured to execute computer-readable program instructions 106 that are contained in the data storage 104 and/or other instructions as described herein.

Data storage 104 can include one or more computer-readable storage media that can be read and/or accessed by at least one of processors 103. The one or more computer-readable storage media can include volatile and/or non-volatile storage components, such as optical, magnetic, organic or other memory or disc storage, which can be integrated in whole or in part with at least one of processors 103. In some embodiments, data storage 104 can be implemented using a single physical device (e.g., one optical, magnetic, organic or other memory or disc storage unit), while in other embodiments, data storage 104 can be implemented using two or more physical devices.

Data storage 104 can include computer-readable program instructions 106 and perhaps additional data. In some embodiments, the data storage 104 can additionally include storage required to perform at least part of the herein-described methods and techniques and/or at least part of the functionality of the herein-described devices and networks.

Example Non-Voice and Voice User Interfaces

Figure 2:
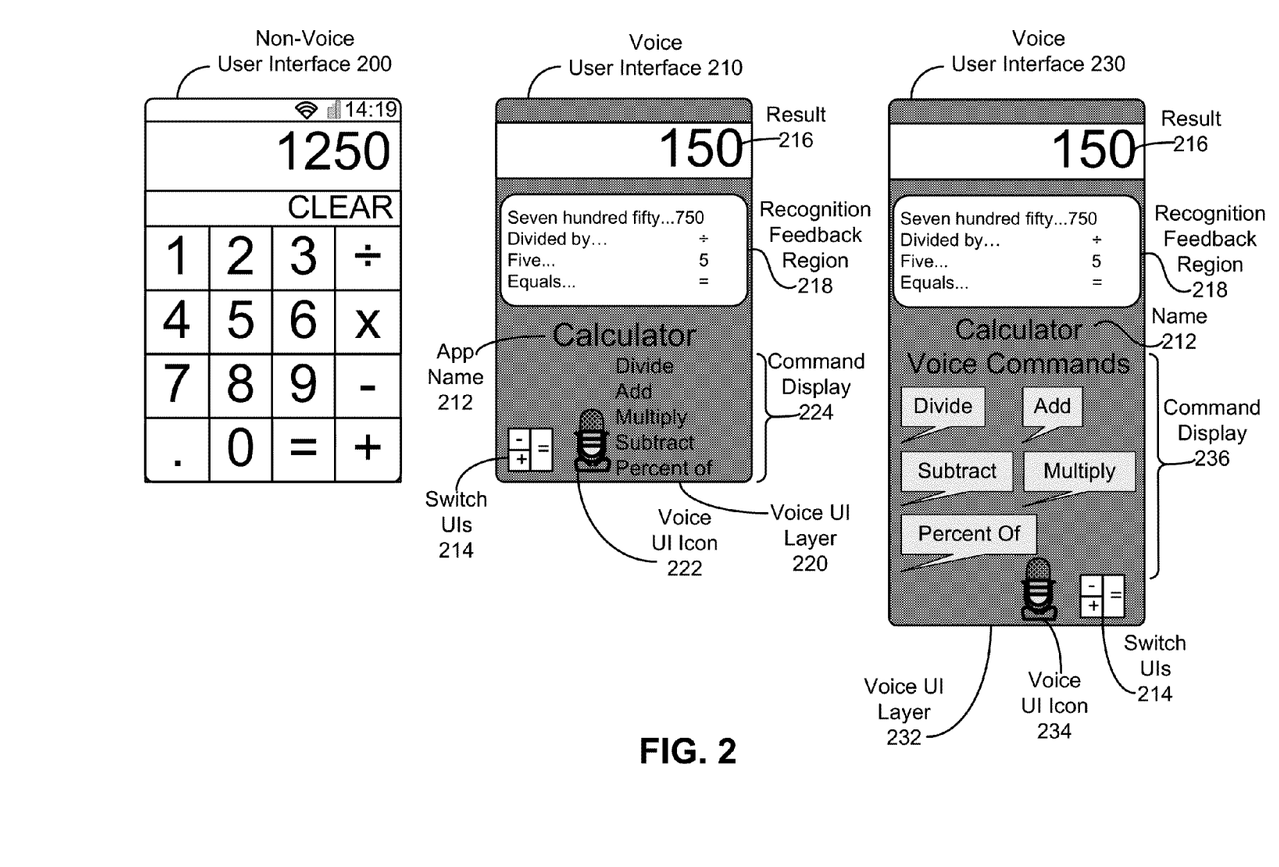
FIG. 2 depicts example user interfaces for a calculator application, in accordance with example embodiments.

FIG. 2 shows three example user interfaces for a calculator application. The calculator application can be software and/or hardware configured to be executed by a computing device, such as computing device 100 discussed above.

Starting on the left of FIG. 2, a non-voice user interface 200 is shown. Non-voice user interface 200 is configured for use with a non-voice user interface, such as but not limited to a keyboard, touch screen, mouse, and combinations thereof. The non-voice user interface 200 emulates a physical calculator with a number pad, a display window for a result, a clear button, and various buttons for mathematical operators.

In the middle of FIG. 2, an example voice user interface 210 to the calculator application is shown. Voice user interface 210 has various visual features that differ from non-voice user interface 200. For example, voice user interface 210 is shown in FIG. 2 with a grey background, while non-voice user interface 200 has a white background. The font used by voice user interface 210 differs from the font used by non-voice user interface 200.

The application name 212 of "Calculator" is provided as part of the voice user interface 210, but is absent from the non-voice user interface 200. In some embodiments, voice user interface 210 can require that voice commands directed to the calculator application start with the name of the application—in this case, "Calculator"—and so displaying application name 212 can aid in utilizing voice user interface 210.

Voice user interface 210 can include a switch user interfaces (UIs) icon 214 to switch between voice user interface 210 and a non-voice user interface, such as non-voice user interface 200. Results of mathematical operations performed by the calculator application can be displayed as result 216 of voice user interface 210.

FIG. 2 shows that voice user interface 210 includes voice user-interface layer 220, which in turn includes a voice user interface icon 222, a command display 224, and a recognition feedback region 218. Voice user interface icon 222 in the form of a microphone can provide a visual reminder to a user of user interface 210 that a voice user interface is active. Command display 224 lists the possible commands to the calculator application available via user interface 210. In some embodiments, command display 224 can be partially or completely configurable. For example, commands can be added to, updated, and/or deleted from command display 224.

In other embodiments, command display 224 can be updated as voice commands are received. For example, suppose a user provided the voice command of "One hundred added to" to voice user interface 210. Then, upon recognizing the voice command, voice user interface 210 can recognize that the next portion of the voice command is likely to be a number. In response, voice user interface 210 can update command display 224 to display the numbers 1, 2, 3 and so on to indicate that the next portion of the voice command is likely to be a number.

Recognition feedback region 218 can display text, numbers, and/or mathematical operators corresponding to voice commands received via voice user interface 210. FIG. 2 shows that recognition feedback region 218 includes reception of the speech commands: (i) "Seven hundred fifty" which corresponds to the number "750", (ii) "Divided by", which corresponds to the division mathematical operator ÷, (iii) "Five" which corresponds to the number "5", and (iv) "Equals" which corresponds to the equality mathematical operator =. Recognition feedback region 218 provides feedback on received speech commands, permitting the user to correct or restart voice command that may be incorrectly translated to text.

Voice user interface 230 is shown on the right-hand side of FIG. 2. As with voice user interface 210, voice user interface 230 includes display of the application name 212, a switch user interfaces (UIs) icon 214, result 216, and recognition feedback region 218. Voice user interface 230 also includes a voice user-interface layer 230 that includes a voice user interface icon 234 and the aforementioned recognition feedback region 218.

However, command display 236 of voice user interface 230 differs from command display 224 of voice user interface 210. Command display 236 adds display of the words "Voice Commands" in comparison to command display 224. Also, command display 236 shows each command for the calculator application (e.g., "Divide", "Add", etc.) inside of a "speech balloon" to further remind a user that voice user interface 230 utilizes voice commands as inputs to the calculator application.

The operation of voice user interface 230 and voice user interface is the same. Each voice user interface 210, 230 accepts voice commands for the calculator application, translates received voice commands to text, displays the translated text and perhaps associated numbers or operators in recognition feedback region 218, and instructs the calculator application to carry out operations in accord with the text of received voice commands.

Example Gestures to Control Use of Multiple User Interfaces

Figure 3:
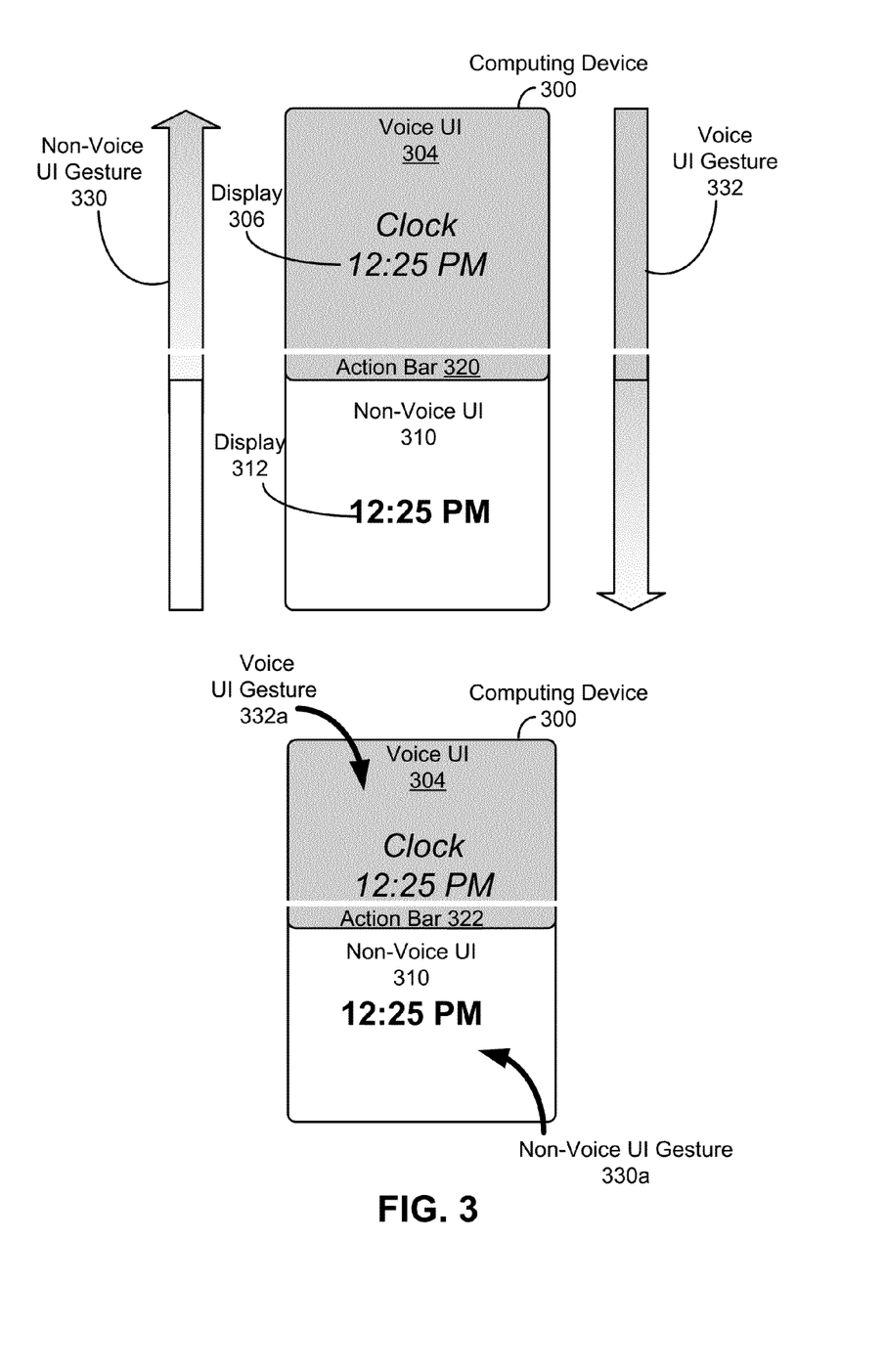
FIG. 3 depicts example gestures used to control display of multiple user interfaces for a clock application, in accordance with example embodiments.

FIG. 3 depicts example gestures used to control display of multiple user interfaces to computing device 300 executing a clock application, in accordance with example embodiments. The top portion of FIG. 3 shows computing device 300 with two user interfaces: voice user interface 304 and non-voice user interface 310.

Both voice user interface 304 and non-voice user interface 310 are shown in FIG. 3 as user interfaces to a clock application executing on computing device 300. FIG. 3 shows that voice user interface 304 includes display 306 that lists the application name of "Clock" and a time of "12:25 PM." FIG. 3 also shows non-voice user interface 310 includes display 312 showing a time of "12:25 PM" but without displaying the application name. As with user interfaces 200, 210, and 230 shown in FIG. 2, voice user interface 304 and non-voice user interface 310 use different visual features, such as display text font, background color, and display of the application name or lack thereof.

FIG. 3 also shows that voice user interface 304 and non-voice user interface 310 are separated by action bar 320. Action bar 320 provides a mechanism to switch between user interfaces. For example, by touching computing device 300 starting from action bar 320 and making a motion in the direction of non-voice user interface gesture 330 toward the top of device 300, the user can use a touch screen of computing device 300 to instruct computing device 300 to use only non-voice user interface 310 to the clock application and remove use of voice user interface 304.

As another example, by touching computing device 300 starting from action bar 320 and making a motion in the direction of voice user interface gesture 332 toward the bottom of device 300, the user can use the touch screen of computing device 300 to instruct computing device 300 to use only voice user interface 304 to the clock application and remove use of non-voice user interface 310.

As shown in FIG. 3, both voice and non-voice user interfaces to the clock application can be used. For example, suppose the clock application permits display of a world clock by either (a) double tapping in a region of non-voice user interface of the touch screen of computing device 300 or (b) by providing the voice command "World Clock" to the clock application. Then, as shown in FIG. 3, computing device 300 will display the world clock either upon reception of a double-tap in the lower portion of the touch screen covering computing device 300 or upon receiving the "World Clock" voice command. Use of multiple user interfaces simultaneously can make computing device 300 easier to use.

In an example not shown in FIG. 3, when voice user interface 304 is the only user interface to the clock application, then voice user interface 304 can include a display bar. Then, for example, by making a gesture starting at the display bar that travels down (or up) the surface of computing device 300, the user can instruct computing device to add use of non-voice user interface 310 along with the use of voice user interface 304 or to remove use of voice user interface 304 with non-voice user interface 310. A similar operation can be performed when non-voice user interface 310 is the only user interface to the clock application to instruct computing device to add use of voice user interface 304 or to replace use of non-voice user interface 310 with use of voice user interface 304.

The bottom portion of FIG. 3 shows the use of additional gestures to use only one user interface. FIG. 3 shows use of a "flipping down" gesture 332a; that is, moving a finger in an arc down and to the right along the surface of computing device 300 in a top region of the touch screen of computing device 300. As the top region of the touch screen is associated with voice user interface 304, computing device 300 can treat voice user interface gesture 332a as a command to only use voice user interface 304 and remove use of non-voice user interface 310.

Similarly, FIG. 3 shows use of a "flipping up" gesture 330a; that is, moving a finger in an arc up and to the left along the surface of computing device 300 in a bottom region of the touch screen of computing device 300. As the top region of the touch screen is associated with non-voice user interface 310, computing device 300 can treat non-voice user interface gesture 330a as a command to only use non-voice user interface 310 and remove use of voice user interface 304.

Other commands, including other gestures, to add, remove, replace, and switch between user interfaces are possible as well.

Example Methods

Figure 4:
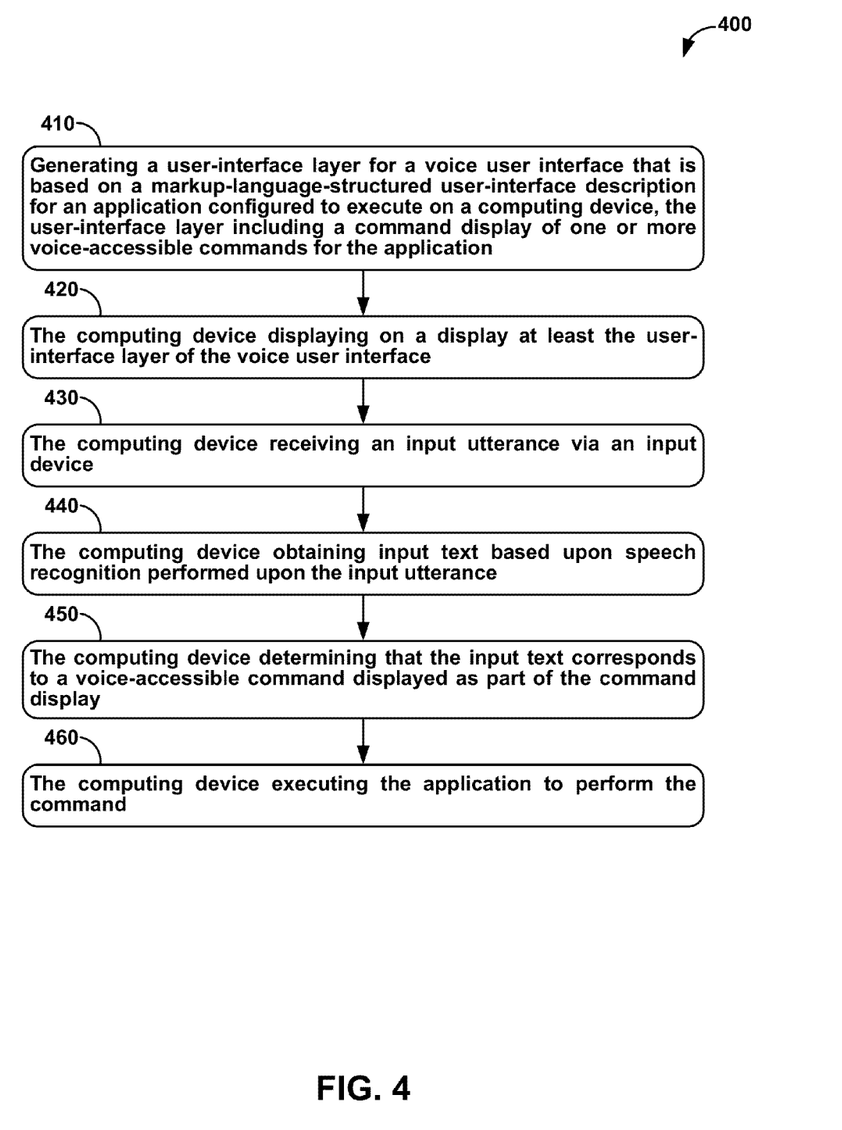
FIG. 4 is a flow chart of a method in accordance with an example embodiment.

FIG. 4 is a flow chart of an example method 400 in accordance with an example embodiment. At block 410 a user-interface layer for a voice user interface can be generated. The user-interface layer can be generated based on a markup-language-structured user-interface description for an application configured to execute on a computing device, such as computing device 100. The user-interface layer can include a command display for the application.

In some embodiments, the command display includes one or more commands that can be executed by the application. Each command in the command display could be displayed textually (e.g., in the form of a word or a phrase), graphically (e.g., in the form of an icon), or could be displayed with both textual and graphical components. The commands can be voice-accessible commands. In some embodiments, the command display is configured to be updated based on user input related to a command of the one or more commands.

In some embodiments, the application can be configured to execute a set of commands that are accessible via user input. The user input could include voice-based input, gesture-based input, and/or other types of input. The one or more commands displayed as part of the command display could be a subset of the set of commands.

At block 420, the computing device can display on a display at least the user-interface layer of the voice user interface.

At block 430, the computing device can receive an input utterance via an input device (e.g., a microphone). The input utterance can include speech that selects one or more of the voice-accessible commands that are displayed as part of the command display.

At block 440, the computing device obtains input text based upon speech recognition performed upon the input utterance. The speech recognition could be performed by a speech recognizer in the computing device. Alternatively, the speech recognition could be performed by a network-based speech recognizer with which the computing device is in communication. For example, the computing device could transmit data representative of the input utterance to a server that functions as a speech recognizer and receive the input text as a speech recognition result from the server.

At block 450, the computing device determines that the input text corresponds to a voice-accessible command displayed as part of the command display. For example, if a command is displayed in the command display in the form of text, the computing device could determine that the input text, or a portion of the input text, corresponds to the text in the command display.

At block 460, the computing device can execute the application to perform the command.

In some embodiments, the application can be configured to operate using a non-voice user interface, in addition to the voice user interface.

In particular embodiments, the voice user interface can include at least one visual feature different from the non-voice user interface. The at least one visual feature can include a font, a color, a recognition-feedback region, or command display.

In some embodiments, the computing device can be configured to present at least part of the voice user interface and at least part of the non-voice user interface simultaneously.

In particular embodiments, the computing device is configured to switch between the voice user interface and the non-voice user interface. In such embodiments, the computing device could be configured to receiving a gesture input via an input device (e.g., a touch screen). In response to the gesture input, the computing device can be configured to switch between the voice user interface and the non-voice user interface.

Figure 5:
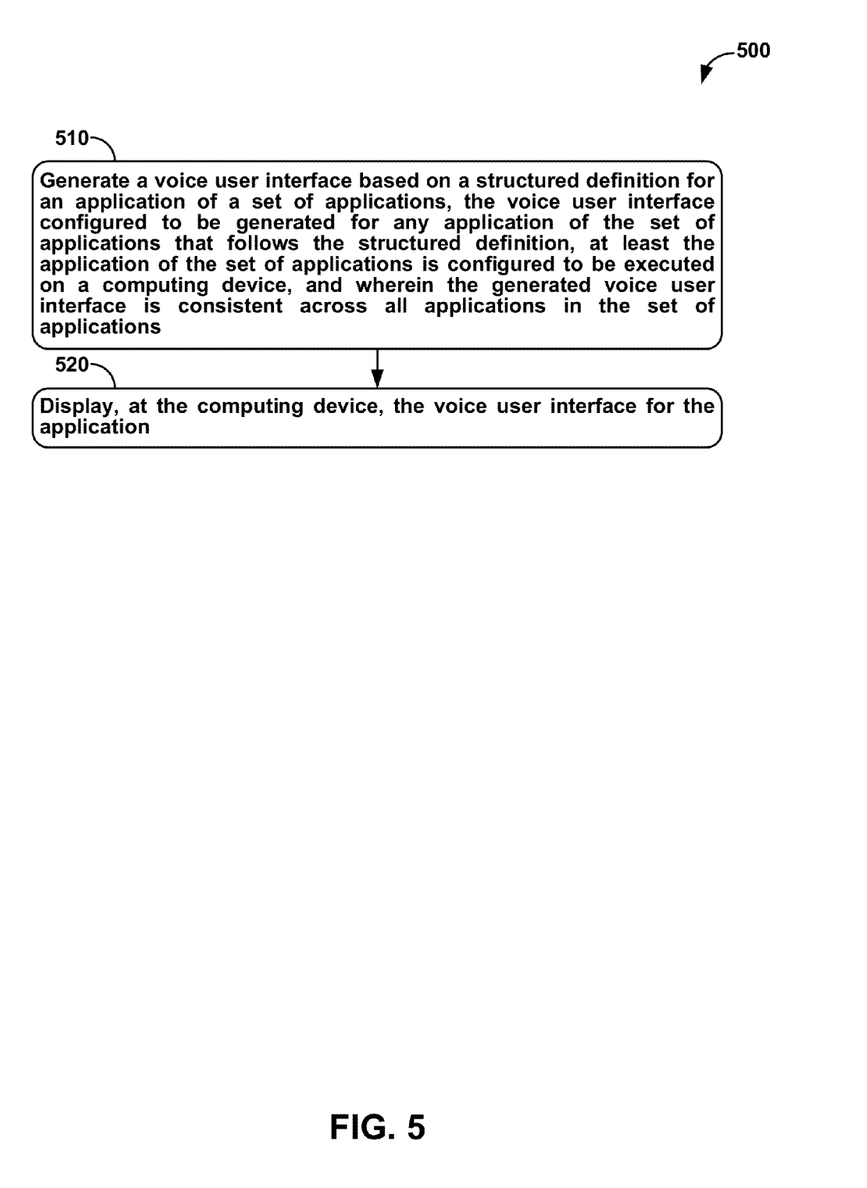
FIG. 5 is a flow chart of another method in accordance with an example embodiment.

FIG. 5 is a flow chart of an example method 500 in accordance with an example embodiment. At block 510 a voice user interface based on a structured definition for an application of a set of applications can be generated. The voice user interface can be configured to be generated for any application of the set of applications that follows the structured definition. At least the application of the set of applications is configured to be executed on a computing device, such as computing device 100. The generated voice user interface can be consistent across all applications in the set of applications.

At block 520, the computing device can display the voice user interface for the application.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as described herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or described, including substantially concurrent or in reverse order, depending on the functionality involved. Further, more or fewer blocks and/or functions can be used with any of the ladder diagrams, scenarios, and flow charts described herein, and these ladder diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
displaying, by a computing device, a display for a voice user interface to an application, the display for the voice user interface comprising a command display of one or more voice accessible commands for the application, a display for a non-voice user interface to the application, and an action bar, wherein the action bar is configured to separate the display for the voice user interface and the display for the non-voice user interface;
receiving, by the computing device, an input utterance;
obtaining, by the computing device, input text based upon speech recognition performed upon the input utterance;
determining, by the computing device, that the input text corresponds to a voice-accessible command displayed as part of the command display;
executing, by the computing device, the application to perform the command;
receiving, by the computing device, input associated with a motion on a touch screen of the computing device, where the motion starts at a region of the touch screen that corresponds to the action bar displayed on the display; and
in response to the input, switching between the voice user interface and the non-voice user interface by the computing device.

2. The method of claim 1, wherein the application is configured to execute a set of commands that are accessible via user input, and wherein the one or more voice-accessible commands displayed as part of the command display are a subset of the set of commands.

3. The method of claim 1, wherein the voice user interface comprises at least one visual feature different from the non-voice user interface, and wherein the at least one visual feature comprises a font, a color, a recognition-feedback region, or command display.

4. The method of claim 1, wherein the application is configured to use the voice user interface, wherein the motion on the touch screen that starts at a region of the touch screen that corresponds to the action bar displayed on the display comprises:
a motion on the touch screen starting at the region of the touch screen that corresponds to the action bar in a direction associated with the non-voice user interface; and
wherein switching between the voice user interface and the non-voice user interface comprises:

in response to the motion on the touch screen in the direction associated with the non-voice user interface, switching to use the non-voice user interface.

5. The method of claim 1, wherein the application is configured to use the non-voice user interface, wherein the motion on the touch screen that starts at a region of the touch screen that corresponds to the action bar displayed on the display comprises:
   a motion on the touch screen starting at the region of the touch screen that corresponds to the action bar in a direction associated with the voice interface; and
   wherein switching between the voice user interface and the non-voice user interface comprises:
   in response to the motion on the touch screen in the direction associated with the voice interface, switching to use the voice user interface.

6. A computing device, comprising:
   a display;
   a touch screen;
   at least one input device;
   a processor; and
   memory having one or more instructions that, upon execution by the processor, cause the computing device to perform functions, the functions comprising:
      displaying, on the display, a display for a voice user interface to an application, the display for the voice user interface comprising a command display of one or more voice accessible commands for the application, a display for a non-voice user interface to the application, and an action bar, wherein the action bar is configured to separate the display for the voice user interface and the display for the non-voice user interface;
      receiving an input utterance via the at least one input device;
      obtaining input text based upon speech recognition performed upon the input utterance;
      determining that the input text corresponds to a voice-accessible command displayed as part of the command display;
      executing the application to perform the command;
      receiving input associated with a motion on the touch screen that starts at a region of the touch screen that corresponds to the action bar displayed on the display; and
      in response to the input, switching between the voice user interface and the non-voice user interface.

7. The computing device of claim 6, wherein the application is configured to execute a set of commands that are accessible via user input, and wherein the one or more voice-accessible commands displayed as part of the command display are a subset of the set of commands.

8. The computing device of claim 6, wherein the voice user interface comprises at least one visual feature different from the non-voice user interface, and wherein the at least one visual feature comprises a font, a color, a recognition-feedback region, or command display.

9. The computing device of claim 6, wherein the application is configured to receive input using the voice user interface, wherein the motion on the touch screen that starts at a region of the touch screen that corresponds to the action bar displayed on the display comprises:
   a motion on the touch screen in a direction associated with the non-voice user interface starting at the region of the touch screen that corresponds to the action bar; and
   wherein switching between the voice user interface and the non-voice user interface comprises:
   in response to the motion on the touch screen in the direction associated with the non-voice user interface, switching to receive input using the non-voice user interface.

10. The computing device of claim 6, wherein the application is configured to receive input using the non-voice user interface, wherein the motion on the touch screen that starts at a region of the touch screen that corresponds to the action bar displayed on the display comprises:
   a motion on the touch screen in a direction associated with the voice interface starting at the region of the touch screen that corresponds to the action bar; and
   wherein switching between the voice user interface and the non-voice user interface comprises:
   in response to the motion on the touch screen in the direction associated with the voice interface, switching to receive input using the voice user interface.

11. An article of manufacture including a non-transitory computer-readable storage medium having instructions stored thereon that, upon execution by a computing device comprising a display, a touch screen, and at least one input device, cause the computing device to perform functions, the functions comprising:
   displaying, on the display, a display for a voice user interface to an application, the display for the voice user interface comprising a command display of one or more voice accessible commands for the application, a display for a non-voice user interface to the application, and an action bar, wherein the action bar is configured to separate the display for the voice user interface and the display for the non-voice user interface, and wherein the application is configured to use both the voice user interface and the non-voice user interface;
   receiving an input utterance via the at least one input device;
   obtaining input text based upon speech recognition performed upon the input utterance;
   determining that the input text corresponds to a voice-accessible command displayed as part of the command display;
   executing the application to perform the command;
   receiving input associated with a motion on the touch screen that starts at a region of the touch screen that corresponds to the action bar displayed on the display; and
   in response to the input, switching between the voice user interface and the non-voice user interface.

12. The article of manufacture of claim 11, wherein the application is configured to execute a set of commands that are accessible via user input, and wherein the one or more voice-accessible commands displayed as part of the command display are a subset of the set of commands.

13. The article of manufacture of claim 11, wherein the voice user interface comprises at least one visual feature different from the non-voice user interface, and wherein the at least one visual feature comprises a font, a color, a recognition-feedback region, or command display.

14. The article of manufacture of claim 11, wherein the application is configured to receive input using the voice user interface, wherein the motion on the touch screen that starts at a region of the touch screen that corresponds to the action bar displayed on the display comprises:
   a motion on the touch screen in a direction associated with the non-voice user interface starting at the region of the touch screen that corresponds to the action bar; and
   wherein switching between the voice user interface and the non-voice user interface comprises:

in response to the motion on the touch screen in the direction associated with the non-voice user interface, switching to receive input using the non-voice user interface.

15. The article of manufacture of claim 11, wherein the application is configured to receive input using the non-voice user interface, wherein the motion on the touch screen that starts at a region of the touch screen that corresponds to the action bar displayed on the display comprises:
  a motion on the touch screen in a direction associated with the voice interface starting at the region of the touch screen that corresponds to the action bar; and
  wherein switching between the voice user interface and the non-voice user interface comprises:
  in response to the motion on the touch screen in the direction associated with the voice interface, switching to receive input using the voice user interface.

* * * * *